C. F. HITCHCOCK.
FLEXIBLE TRACTOR TREAD.
APPLICATION FILED JULY 17, 1916.
1,253,378.
Patented Jan. 15, 1918.
3 SHEETS—SHEET 2.
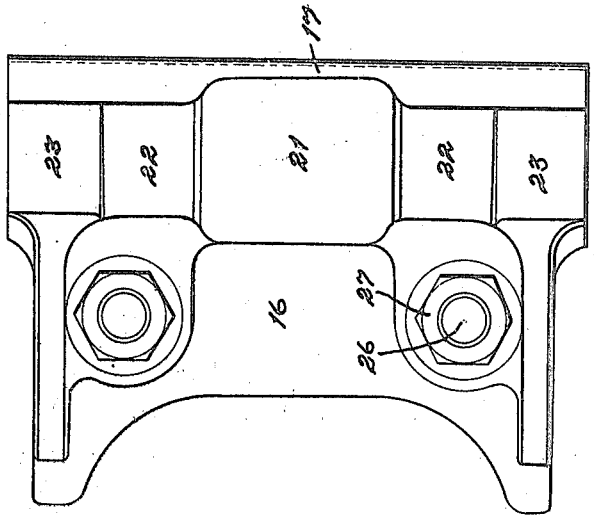
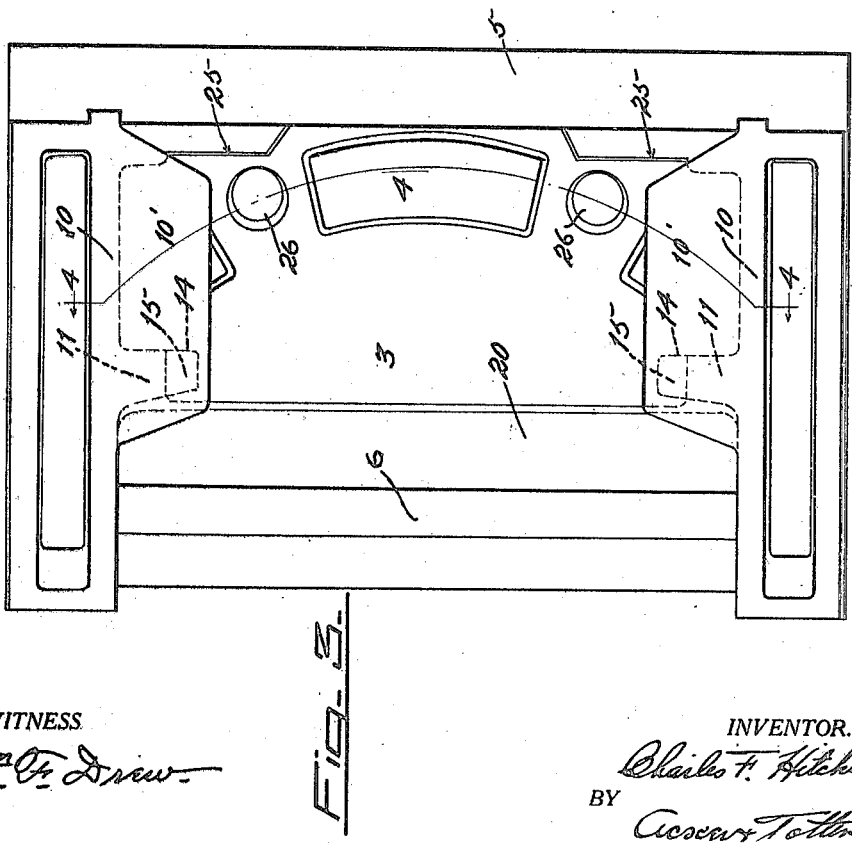
WITNESS
INVENTOR.
ATTORNEYS

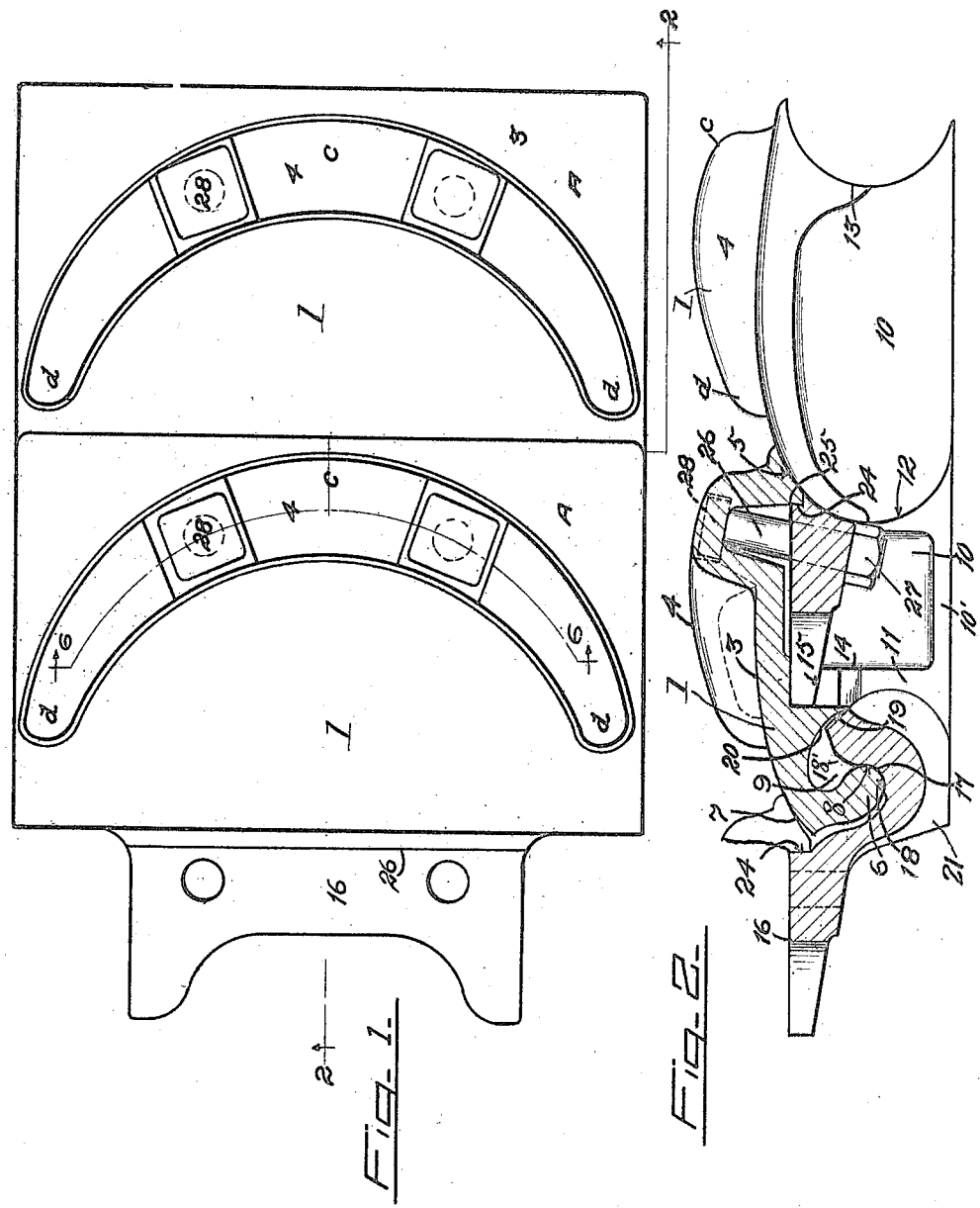

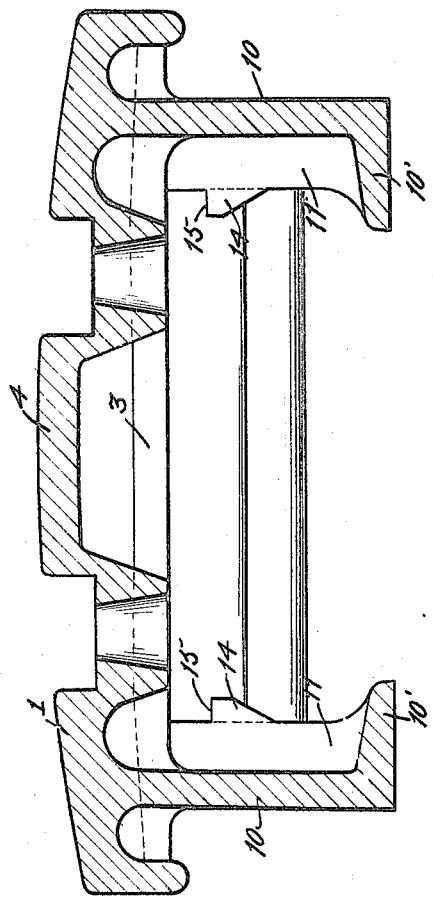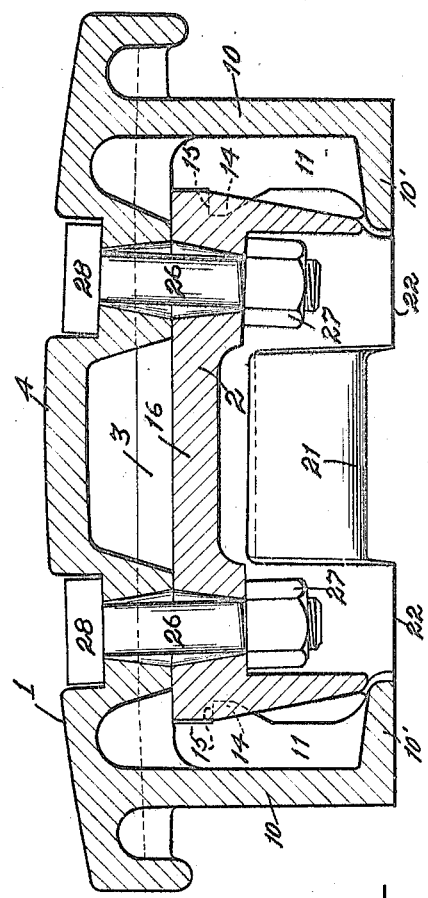

UNITED STATES PATENT OFFICE.

CHARLES F. HITCHCOCK, OF BERKELEY, CALIFORNIA.

FLEXIBLE TRACTOR-TREAD.

1,253,378.

Specification of Letters Patent.

Patented Jan. 15, 1918.

Application filed July 17, 1916. Serial No. 109,636.

*To all whom it may concern:*

Be it known that I, CHARLES F. HITCHCOCK, a citizen of the United States, residing at Berkeley, in the county of Alameda and State of California, have invented certain new and useful Improvements in Flexible Tractor-Treads, of which the following is a specification.

The present invention relates to improvements in a tread of the link type adapted for use in connection with what are commonly termed "caterpillar" tractors, and has for its principal objects to provide a link tread wherein the tread supporting chains and link connecting pins are dispensed with and the tread and chain are incorporated in one, the tread links or shoes connected together by coacting interlocking integral portions which have a rolling contact between the engaging surfaces thereof, whereby the friction and consequent wear between the links or shoes is overcome, one wherein the tread shoes or links are constructed of a plurality of members detachably secured together, enabling any member to be readily, quickly and cheaply replaced when the same become worn or broken, and wherein one of the members of the tread links or shoes may be formed of cast metal, which permits those parts receiving the greatest strains and wear to be formed of chilled or wear resisting metal and the parts being capable of assembling or interchanging without machining the same, thereby materially reducing the cost of the tread. Other and important objects are to provide a link tread wherein grit and other foreign material is excluded from the rolling contacting joint portions of the tread links, and one wherein the tread link portions when secured together interlock with and provide a link joint between adjacent tread links, and one wherein the links are capable of being quickly and easily separated or assembled. A further object is to provide a link tread wherein the sprocket teeth engaging members are formed integral with the tread shoes and are removable therewith.

With the above mentioned and other objects in view, the invention consists in the novel construction and combination of parts hereinafter described, and the preferred embodiment of which is set forth in the accompanying drawings; it being understood, however, that various changes in the form, proportion, size and minor details of construction within the scope of the appended claims may be resorted to without departing from the spirit or sacrificing any of the advantages of the invention.

To more fully comprehend the invention, reference is directed to the accompanying drawings, wherein—

Figure 1 is a view in plan of the preferred embodiment of my combined tractor tread and link, illustrating more fully the tread shoe and grouser formed thereon.

Fig. 2 is a sectional view taken on line 2—2 of Fig. 1, disclosing the separable interlocking shoe and hook members forming the link tread.

Fig. 3 is an inverted plan view of the tread shoe.

Fig. 4 is a sectional view taken on line 4—4 of Fig. 3.

Fig. 5 is an inverted plan view of the hook or link portion.

Fig. 6 is a sectional view taken on line 6—6 of Fig. 1, viewed in the direction of the arrows.

Referring more particularly to the several views of the drawings, wherein like characters of reference designate corresponding parts, A indicate the interconnected tread links of a flexible tractor tread, each of said links being preferably formed of two members, a shoe or tread portion 1 and a hooked link or connecting portion 2. The portions 1 and 2 are preferably of cast metal, such as iron or steel, and, if desirable, those portions which are subjected to greatest strains or wear may be chilled or hardened.

The shoe or tread portion 1 of each link, which is preferably formed of a single casting, comprises the face member 3 transversely of which is formed the outwardly extending transversely disposed integral grouser or ground engaging portion 4, which is preferably semi-circular in shape and serves as a reinforcement or strengthening rib for the shoe. By forming the grouser 4 semi-circular in shape, after the pattern of the conventional horse-shoe, and disposing the toe $c$, and heel-portions $d$ thereof adjacent opposite longitudinal side edges of the face, a more continuous bearing surface on the soil is obtained, as in the movement of the tread over the soil, and relatively to the tread supporting wheels, not shown, the load is gradually transferred from the terminal or heel-portions $d$ of the grouser to the toe $c$ thereof, and thence to the heel-ports $d$ of the next link which terminates a short distance from the toe of an adjacent link.

Each shoe or tread portion 1 of each link is formed on the under surface of one side edge with a curved seat or surface 5 and on its opposite edge with a downwardly and inwardly curved male hooked-portion 6 which extends approximately the full width of the underside of the shoe, as in Fig. 3 of the drawings. The upper surface of said hooked-portion is curved, as at 7, in conformity with the curved seat or surface 5, at the opposite edge of the shoe, and the terminal edge of said hooked-portion is rounded, as at 8. The inward and downward curving of the male hooked-portion 6 provides a recess or chamber 9 on the underside of the shoe between the male hooked-portion 6 and the underside of surface 3, as in Fig. 2 of the drawings. Adjacent the opposite ends of each shoe are formed integral end flanges 10 and base flanges 10' extending inwardly therefrom, and said flanges are strengthened by the ribs or webs 11, as in Figs. 2, 4 and 6 of the drawings; the opposite ends of said end flanges being respectively curved inwardly and outwardly, as at 12 and 13, so that adjacent ends of coöperating flanges will interfit to provide a dust-proof joint between the ends of the shoes when assembled.

The ribs or webs 11 are each formed in spaced relation to the under face of the surface 3 with a suitable inwardly projecting lug 14, as in Figs. 4 and 6 of the drawings, the upper surface 15 of said lugs being tapered or beveled downwardly, as in Fig. 2 of the drawings.

Each link or connecting portion 2 is preferably formed of cast metal, and is of a width to be received on the underside of the shoe between the end flanges 10. The link connecting portions comprise the tapering shank or base portion 16 terminating at one longitudinal side edge in the female hooked receiving portion 17, which receives the male hooked portion 6 of an adjacent shoe or tread portion, as in Fig. 2 of the drawings. The female hooked receiving portion 17 is channeled, as at 18, to correspond with the curve 8 of the hooked portion 6, and the end thereof is also curved, as at 19, to provide a running dust and grit tight joint with the curved surface 20 of the upper surface of the chamber 9 of the tread member, as in Fig. 2 of the drawings. The terminal portion of the inner face of said hooked portion is formed with a straight wall 18' over which the curved wall 8 of the hooked portion 6 rides during the movement of the shoes on the tread supporting wheels.

The outer base surface of the female hooked receiving portion 17 is provided centrally of its width with a suitable tooth 21, Figs. 2, 5 and 6 of the drawings, for reception between the teeth of a supporting and driving sprocket, and at opposite sides of said teeth are formed the bearing blocks 22 and 23 arranged in pairs, as in Fig. 5 of the drawings, and the surfaces of each pair of blocks are preferably of a different pitch. Certain of the bearing blocks, preferably each inner pair on the underside of each connecting member, support the tread on suitable bearing flanges formed on the drive sprocket wheels mounting the tread and around which the same extends, thereby eliminating the strain or friction load on the sprocket teeth, and also eliminating the stretching of the link tread which is usually caused by the wear on the sprocket teeth, and the other blocks, preferably of each outer pair, rest on and sustain the load intermediate said sprocket wheels on a suitable track or supporting wheels positioned intermediate the sprocket wheels, with the bearing surface thereof in a plane offset from and exteriorly of the bearing flanges of the sprocket wheels.

In assembling the shoe or tread portions 1 and hooked link portions 2, reference being directed to Fig. 2 of the drawings, the shank or base portion 16 of a link or connecting portion 2 is positioned beneath the underside of a tread portion 1 with a male hooked portion 6 of an adjacent tread portion 1 received in the female hooked receiving portion 17 thereof, and with the terminal end of the shank or base portion 16 thereof seated between the upper surface 15 of the inwardly projecting lugs 14 and the underside of the surface 3 of the tread; this arrangement also insuring the coöperating of the interfitting curved portions 12 and 13. In this position the forward shouldered portion 24 of the shank 16 is received in rear of a retaining lug 25 extending transversely of the under surface of the tread in rear of the curved edge 5 thereof, and it will be observed that in this position the pulling strain is received on the lugs 14 and coöperating shouldered portion 24 and retaining lug 25.

Suitable bolts or other suitable securing means 26 passing through the grouser 4 of the tread portion and through the shank 15 intermediate of its edges detachably secure the respective tread and link or connecting portions together, as in Figs. 2 and 6 of the drawings, and when the nuts 27 thereof are tightened the coöperating tread and link or connecting portions 1 and 2 are drawn together. In this assembling, the coacting curved surfaces 5 and 7 of adjacent tread portions 1 provide a grit tight joint for the tread of the link joint connection; coöperating curved surfaces 19 and 20 exclude dust and grit from the underside of the link joint connection; the coöperating curved end portions 12 and 13 of the side flanges 10 prevent the entering of sand or grit at the ends of the link joint connection, and the coöperating hooked male and female portions 6 and 17 provide a rolling joint connection between each tread link, thereby eliminating all frictional wear.

It is preferable that the headed portion 28 of the securing bolts or other fastening means terminate approximately flush with the outer face of the grouser and complete the tread face thereof.

By my improved construction, I have provided a link tread wherein each link comprises two coöperating members capable of being quickly and easily separated, and when assembled interlocking by a rolling joint with coöperating members of an adjacent link, I have also provided a link tread wherein the parts forming each link are interchangeable and are capable of being quickly and cheaply replaced or renewed when the same become broken or worn.

While I have illustrated the male and female members as being carried respectively by the tread portion 1 and connecting portion 2, it is understood that the same may be transposed, if desirable, without departing from the spirit of the invention.

Having thus described my invention, what I claim as new and desire to protect by Letters Patent is:—

1. A caterpillar track comprising a plurality of interconnected shoes, each of said shoes consisting of a tread member and a connecting member, means for detachably uniting said members together, and each of said members formed with an integral hooked extension adapted for interlocking with a coöperating hooked extension of an adjacent member to provide a flexible joint between said shoes.

2. A caterpillar track comprising a plurality of interconnected shoes, each of said shoes consisting of a tread member and a connecting member, said members each formed with an integral hooked extension, the hooked extension of one member adapted for interlocking with the hooked extension of a different member of an adjacent shoe to provide a flexible joint between said shoes, and means for detachably securing the members of respective shoes together.

3. A caterpillar track comprising a plurality of interconnected shoes, each of said shoes consisting of a tread member and a connecting member, said members each formed on one side edge with an integral hooked extension, the hooked extension of one member adapted for interlocking with the hooked extension of a different member of an adjacent shoe to provide a flexible joint between said shoes, and means for detachably uniting the members of the respective shoes together with the side edge of one member projecting over the hooked extension of a different member of an adjacent shoe.

4. A caterpillar track comprising a plurality of interconnected shoes, each of said shoes consisting of a tread member and a connecting member, and each of said members formed with an integral hooked extension, means for detachably securing said members together in superimposed relation with the hooked extension of the respective members disposed one at each longitudinal side edge of the respective shoes and disposed in opposite directions relatively to the opposing faces of the shoe.

5. A caterpillar track comprising a plurality of interconnected shoes, each of said shoes comprising a connecting member and a tread member having a chilled surface, each of said members formed with an integral hooked extension, adapted for interlocking with a coöperating hooked extension of an adjacent member to provide a flexible joint between said shoes, and means for detachably uniting said members together in superimposed relation.

6. A caterpillar track comprising a plurality of interconnected shoes, each of said shoes consisting of a cast metallic tread member and a cast metallic connecting member, means for uniting said members together, and each of said members formed with an integral hooked extension adapted for interlocking with a coöperating hooked extension of an adjacent member to provide a flexible joint between said shoes.

7. A caterpillar track comprising a plurality of interconnected shoes, each of said shoes consisting of separable coöperating tread and connecting members arranged in superimposed relation, said tread member provided on its tread surface with a grouser, means for detachably uniting said members together, each of said members formed on one edge with an integral hooked extension adapted for interlocking with a hooked extension of a different member of an adjacent shoe to provide a flexible joint between said shoes.

8. A caterpillar track comprising a plurality of interconnected shoes, each of said shoes consisting of a tread member and a connecting member, means for detachably uniting said members together, each of said members formed with an integral hooked extension adapted for interlocking with a coöperating hooked extension of an adjacent member to provide a flexible joint between said shoes, and one of said members carrying an integral sprocket tooth engaging portion.

9. A caterpillar track comprising a plurality of interconnected shoes, each of said shoes consisting of a tread member and a connecting member, means for detachably uniting said members together, each of said members formed with an integral hooked extension adapted for interlocking with a coöperating hooked extension of an adjacent member to provide a flexible joint between said shoes, and the under surface of the integral hooked extension of said connecting member providing a sprocket tooth engaging portion.

10. A caterpillar track comprising a plurality of interconnected shoes, each of said shoes consisting of a tread member and a connecting member, means for detachably uniting said members together, each of said members formed with an integral hooked extension adapted for interlocking with a coöperating hooked extension of an adjacent member to provide a flexible joint between said shoes, and said connecting member provided with a sprocket tooth engaging portion.

11. A caterpillar track comprising a plurality of interconnected shoes, each of said shoes consisting of a tread member and a connecting member, each of said members formed with an integral extension for interlocking with a coöperating extension of an adjacent member to provide a flexible joint between said shoes, and means for detachably connecting the respective members of each shoe together.

12. A caterpillar track comprising a plurality of interconnected shoes, each of said shoes consisting of a tread member and a connecting member arranged in superimposed relation, each of said members formed with an integral extension for interlocking with a coöperating extension of an adjacent member to provide a flexible joint between said shoes, coöperating interengaging portions formed on said members for receiving the longitudinal pulling strains to which said shoes are subjected, and means for detachably securing said members together in superimposed relation, said means being free from longitudinal strain placed on said shoes.

13. A caterpillar track comprising a plurality of interconnected shoes, each of said shoes consisting of a tread member and a connecting member, each of said members formed on one side edge with an integral hooked extension, the hooked extension of one member adapted for interlocking with the hooked extension of a different member of an adjacent shoe to provide a flexible joint between said shoes.

14. A caterpillar track comprising a plurality of interconnected shoes, each of said shoes consisting of a tread member and a connecting member, said members each formed on one side edge with an integral hooked extension, the hooked extension of one member adapted for interlocking with the hooked extension of a different member of an adjacent shoe to provide a flexible joint between said shoes, means for detachably uniting the members of the respective shoes together, said members when united together being arranged with the side edge of one member projecting over the fulcrum point of said hooked portions and having frictional contact with the opposite end of a like member of an adjacent shoe, to provide a grit-proof joint at one side of the fulcrum point of said hooked portions, and with the terminal end of one hooked portion having frictional contact with a different member of an adjacent shoe to provide a grit-proof joint at the other side of the fulcrum point of said hooked portions.

15. A grit-proof flexible connection for caterpillar tractor shoes, comprising oppositely disposed hooked portions carried by members of adjacent shoes and interengaging with each other with the terminal end portion of one hooked member in frictional contact with a portion of its coöperating hooked member, and a plate detachably secured to one of said hooked members for projecting beyond the fulcrum point of said hooked portions, and said plate having frictional contact with a portion of the hooked member of the adjacent shoe.

In testimony whereof I have signed my name to this specification in the presence of the subscribing witness.

CHARLES F. HITCHCOCK.

Witness:
   D. B. RICHARDS.

Copies of this patent may be obtained for five cents each, by addressing the "Commissioner of Patents, Washington, D. C."